(12) United States Patent
Fan et al.

(10) Patent No.: US 10,003,570 B2
(45) Date of Patent: Jun. 19, 2018

(54) METHOD AND DEVICE FOR INFORMING USER ADDRESS

(71) Applicant: ZTE CORPORATION, Shenzhen, Guangdong Province (CN)

(72) Inventors: Liang Fan, Shenzhen (CN); Bo Yuan, Shenzhen (CN); Jianjie You, Shenzhen (CN); Chunhui Zhu, Shenzhen (CN)

(73) Assignee: ZTE CORPORATION, Shenzhen, Guangdong Providence (CN)

( * ) Notice: Subject to any disclaimer, the term of this patent is extended or adjusted under 35 U.S.C. 154(b) by 247 days.

(21) Appl. No.: 14/395,463

(22) PCT Filed: Apr. 7, 2013

(86) PCT No.: PCT/CN2013/073840
§ 371 (c)(1),
(2) Date: Oct. 17, 2014

(87) PCT Pub. No.: WO2013/155938
PCT Pub. Date: Oct. 24, 2013

(65) Prior Publication Data
US 2015/0334083 A1 Nov. 19, 2015

(30) Foreign Application Priority Data
Apr. 18, 2012 (CN) .......................... 2012 1 0114659

(51) Int. Cl.
*H04L 29/12* (2006.01)
*H04W 8/26* (2009.01)

(52) U.S. Cl.
CPC ...... *H04L 61/203* (2013.01); *H04L 29/12009* (2013.01); *H04L 61/2076* (2013.01); *H04W 8/26* (2013.01); *H04L 61/6068* (2013.01)

(58) Field of Classification Search
CPC ................................................. H04L 29/12009
(Continued)

(56) References Cited

U.S. PATENT DOCUMENTS

2012/0063428 A1* 3/2012 Ng .................... H04W 36/0016
370/338

FOREIGN PATENT DOCUMENTS

| CN | 102300263 A | 12/2011 |
| CN | 102340866 A | 2/2012 |
| CN | 102377831 A | 3/2012 |

OTHER PUBLICATIONS

International Search Report (Form PCT/ISA/210) for PCT/CN2013/073840 dated Jul. 18, 2013.
(Continued)

*Primary Examiner* — Adnan Mirza
(74) *Attorney, Agent, or Firm* — Koppel, Patrick, Heybl & Philpott

(57) ABSTRACT

A method and device for informing user address are disclosed. The method comprises: a defined network allocating, according to a user address prefix provided by a mobile network, a user address to a mobile network user accessing the mobile network from the defined network; and the defined network informing the mobile network of the allocated user address. The disclosure address the problems of complex flow for allocating user address and low allocation efficiency, and how to inform a mobile network of an allocated user address existing in the related art, thus achieving the allocation of an user address and improving informing efficiency.

12 Claims, 9 Drawing Sheets

(58) Field of Classification Search
USPC .......................................................... 709/245
See application file for complete search history.

(56) References Cited

OTHER PUBLICATIONS

"Allowing access to HTTP services of the HPLMN to an UE connected over a BBF access providing NSWO", 3GPP SA WG2 Meeting #89, Feb. 6-10, 2012, Vancouver, BC, Canada.

* cited by examiner

METHOD AND DEVICE FOR INFORMING USER ADDRESS

FIELD

This disclosure relates to the communication field including, e.g., a method and device for informing user address.

BACKGROUND

With the development of network technologies and the increase of demands of users on services, a terminal includes more and more components so as to selectively access different kinds of access networks for bearing diversified services. Different network connections having different characteristics and transmission capacities, the diversified demands of the users for a variety of services are better meet. A multi-component terminal can realize the seamless connection between the different kinds of wireless access networks, for example, the connection between a Universal Mobile Telecommunications System (UMTS)/Enhanced Data Rate for GSM Evolution (EDGE)/General Packet Radio Service (GPRS) and Wireless Local Area Networks (WLAN) of Institute of Electrical and Electronics Engineers (IEEE) of USA 802.11. The WLAN is capable of providing a high data rate in a small region such as a house or a hot spot region, and the cellular network, although relatively low in data rate, is capable of providing a more flexibility and coverage everywhere; the user benefit when the advantages of the WLAN an d the advantages of the cellular network is combined. A multi-component terminal implements data access and Voice over Internet Protocol (VoIP) by using the various applications (e.g. media center or printer) provided by a WLAN within the coverage range of a WLAN access point and implements a voice call or a media access through an overlapped cellular network.

At present, the internal standardization organization Broadband Forum (BBF) and the 3GPP are carrying out the standardization work of Fixed Mobile Convergence (FMC). The follow is described based on an example in which a mobile network is a 3GPP Core Network and a defined network is a BBF defined access network. The involved work includes the authentication on the access of a 3GPP UE from a BBF network via a Residential Gateway (RG) in a broadband home network, address allocation and strategy control. During the authentication process, as a 802.1x client, the 3GPP UE initiates an access authentication at an RG, at this time, as a 802.1x authenticator and a Remote Authentication Dial In User Service (RADIUS) client, the RG sends an authentication request to an Authentication Authorization Accounting (BBF AAA) server. During an address request process, the address request message sent from the 3GPP UE requests for an IP address from a Packet Data Network Gateway (PDN-GW) via a Broadband Network Gateway (BNG) device. An S2a session is established between the BNG and the PDN-GW and realized based on a GPRS Tunneling Protocol (GTP) or a Proxy Mobile Internet Protocol (PMIP) channel, and a wireless operator is connected with the above PDN-GW to provide various IP services.

In related technologies, an S2a session needs to be established between the BNG of each user and a PDN-GW. To support this scenario in an existing network, all BNG devices need to be updated; however, the update on all BNG devices will bring a great influence on the network. To solve this problem, two methods are generally used in related technologies: (1) adding a BBF WLAN Access Gateway (BWAG), FIG. 1 is a diagram illustrating a network architecture introducing a BWAG in a rated technology, and as shown in FIG. 1, by adding the BWAG, the large-scale update on BNG devices is not needed any more, which minimizes the influence on an existing network. However, no corresponding specification is provided for the application of network architecture being added the BWAG, especially, the influences on a BNG or a BBF AAA are not taken into consideration. (2) providing an enhanced BNG to support the session with a PDN-GW. FIG. 2 is a diagram illustrating a network architecture including an enhanced BNG in a related technology, and as shown in FIG. 2, compared to FIG. 1, the enhanced BNG is the integration of the BWAG and the BNG shown in FIG. 1. However, in this method, all BNGs need to be updated, and similarly, there are still some limitations, for example, how to the address allocation for a 3GPP UE and how to inform of the mobile network (e.g. 3GPP core network) of the allocated user address in this scenario.

Based on the foregoing network architectures, in the related art, when a 3GPP UE accesses a BBF network and is connected with a 3GPP core network, the 3GPP network allocates an IP address for the UE. When different 3GPP UEs access the BBF network via different BNGs, which is unperceptive for the 3GPP network, the addresses allocated by the 3GPP network cannot be converged when it is routed over the BBF network. Further, a great number of user-level routings appear in the BBF network, and even if the user-level routings take a defined channel from the BNG to the BWAG, there are still plenty of user-level routings and Access Control Lists (ACL) on the BNG and the BWAG.

Thus, no effective solution has been proposed to solve the problems of complex flow for allocating user address and low allocation efficiency, and how to inform a mobile network of an allocated user address in a related network architecture where a defined network and the mobile network are converged.

SUMMARY

This disclosure provides a method and a device for informing a user address, at least to solve the problems of complex flow for allocating user address and low allocation efficiency, and how to inform a mobile network of an allocated user address in the related art.

According to an aspect of the disclosure, a method for informing user address is provided, comprising: a defined network allocating, according to a user address prefix provided by a mobile network, a user address to a mobile network user accessing the mobile network from the defined network; and the defined network informing the mobile network of the allocated user address.

The defined network informing the mobile network of the allocated user address comprises: acquiring, by a BNG or enhanced BNG (eBNG) in the defined network, the user address allocated by the defined network; sending, by the BNG or eBNG, the acquired user address to an Authentication Authorization Accounting (AAA) server in the defined network; and informing, by the AAA server in the defined network, an AAA server in the mobile network of the user address.

The defined network informing the mobile network of the allocated user address comprises: acquiring, by a BNG or eBNG in the defined network, the user address allocated by the defined network; sending, by the BNG or eBNG, the acquired user address to a mobile network gateway in the mobile network via a BWAG; or senging, by the eBNG, the acquired user address to a mobile network gateway in the mobile network.

The BNG or eBNG acquires the user address by at least one of the following ways: the BNG or eBNG acquiring the user address according to the user address prefix allocated to the mobile network user; the BNG or eBNG receiving the user address allocated and reported by an RG; the BNG or eBNG receiving the user address reported by the mobile network user; and the BNG or eBNG receiving the user address forwarded by the RG, wherein the mobile terminal user reports the user address to the RG.

The BNG or eBNG acquiring the user address comprises: receiving an accounting start message, wherein the user address is carried in the accounting start message.

Informing, by the defined network, the mobile terminal of the allocated user address comprises: after the defined network acquiring the mobile network identifier of the mobile network user, informing the mobile network of the acquired mobile network identifier and the allocated user address.

According to another aspect of the disclosure, a device for informing user address is provided, located in a defined network, comprising: an allocating component, configured to allocate, according to a user address prefix provided by a mobile network, a user address to a mobile network user accessing the mobile network from the defined network; and an informing component, configured to inform the mobile network of the allocated user address.

The informing component comprises: a first acquiring component, located in a BNG or eBNG in the defined network, configured to acquire the user address allocated by the defined network; a first sending component, located in the BNG or eBNG, configured to send the acquired user address to an AAA server in the defined network; and a first informing component, located in the AAA server in the defined network, configured to inform an AAA server in the mobile network of the user address.

The informing component comprises: a second acquiring component, located in the BNG or eBNG in the defined network, configured to acquire the user address allocated by the defined network; and a second sending component, located in the BNG, configured to send the acquired user address to a mobile network gateway in the mobile network via a broadband Forum (BBF) WLAN Access Gateway (BWAG); or located in the eBNG, configured to send the acquired user address to a mobile network gateway in the mobile network.

The first or second acquiring component or the second acquiring component, configured to acquire the user address by at least one of the following ways: the BNG or eBNG acquiring the user address according to the user address prefix allocated to the mobile network user; the BNG or eBNG receiving the user address allocated and reported by an RG; the BNG or eBNG receiving the user address reported by the mobile network user; and the BNG or eBNG receiving the user address forwarded by the RG, wherein the mobile terminal user reports the user address to the RG.

The informing component is further configured to, after the defined network acquiring the mobile network identifier of the mobile network user, inform the mobile network of the acquired mobile network identifier and the allocated user address.

According to the disclosure, a defined network allocating, according to a user address prefix provided by a mobile network, a user address to a mobile network user accessing the mobile network from the defined network; and the defined network informing the mobile network of the allocated user address. Thus solving the problems of complex flow for allocating user address and low allocation efficiency, and how to inform a mobile network of an allocated user address in the related art, and achieving the allocation of an user address and improving informing efficiency.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The disclosure is described below in detail in conjunction with the drawings and embodiments. It should be noted that the embodiments of the present application and the features of the embodiments can be combined with each other if there is no conflict.

Figure 3:
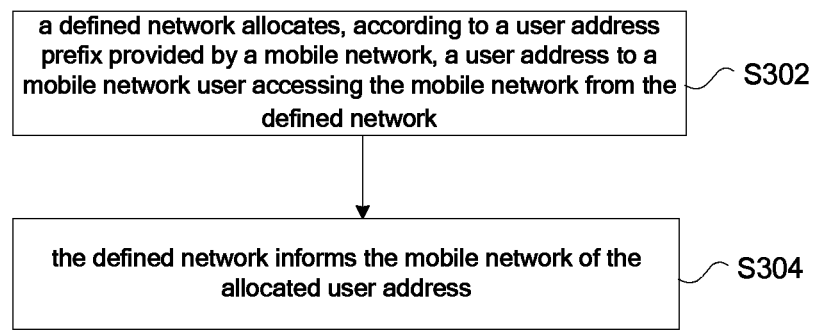
FIG. 3 is a flowchart illustrating a method for informing user address according to an embodiment of the disclosure.

A method for informing user address is provided in the embodiment. FIG. 3 is a flowchart illustrating a method for informing user address according to an embodiment of the disclosure, as shown in FIG. 3, the flow comprises the following steps:

Step S302, a defined network allocates, according to a user address prefix provided by a mobile network, a user address to a mobile network user accessing the mobile network from the defined network;

Step S304, the defined network informs the mobile network of the allocated user address.

By executing the above steps, the defined network allocates a user address to a mobile network user according to a user address prefix provided by a mobile network, thus effectively avoiding the complexity in the related art of which the mobile network needs to separately allocate a user address to each mobile network user, and improving the efficiency of user address allocation; moreover, the defined network informs the mobile network of the user address allocated according to the user address prefix, thus, compared with by the reporting flow of the mobile network user in the related art, a defined network itself reports in the method described in the embodiment; it is not only possible to realize a service interaction between the mobile network user and a mobile network, but also it improves the efficiency of informing user address to a certain extent.

Figure 1:
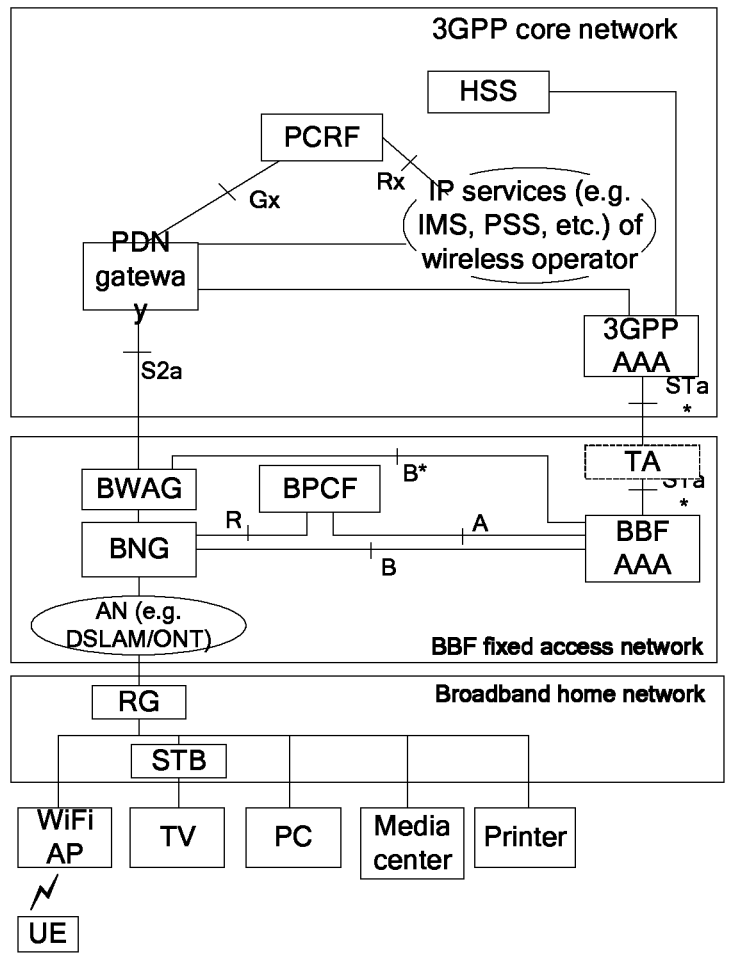
FIG. 1 is a diagram illustrating a network architecture introducing a BWAG into a related technology.

The defined network may inform the mobile network of the allocated user address in many ways. The defined network informs different network elements in the mobile network of the allocated user address in different ways, and the example of taking the AAA server and the mobile network gateway in the mobile as the informed object is described in the following embodiment. (1) the informed object is an AAA server in the mobile network, in this case, the BNG or eBNG in the defined network acquires the user address allocated by the defined network and sends the acquired user address to an AAA server in the defined network; and the AAA server in the defined network informs an AAA server in the mobile network of the user address; (2) the informed object is a mobile network gateway in the mobile network, in this case, the BNG or eBNG in the defined network acquires the user address allocated by the defined network; the BNG sends the acquired user address to a mobile network gateway in the mobile network via a BWAG; or the eBNG sends the acquired user address to the mobile network gateway in the mobile network. It should be noted that the above BNG and eBNG is respectively the BNG and eBNG in the network architectures shown in FIG. 1 and FIG. 2. The two processing methods can be flexibly selected according to different network architectures. Further, as to the different demands of the different network elements in the mobile network, the informed object may be a network element which need the user address, and the defined network informs such a network element in the mobile network of the user address allocated to a mobile network user.

According to the different ways by which the defined network allocates a user address to a mobile network user according to a user address prefix, the defined network may also inform the mobile network of the allocated user address in different corresponding ways. Kinds of possible ways are described in the following embodiment. It should be noted that the following nonexclusive ways are described by way of example only, and the present application is not limited to the foiling example. That is, the BNG or eBNG acquires the user address by at least one of the following ways: when the way of the defined network allocating a user address to a mobile network user according to a user address prefix is that the BNG or eBNG allocates a sub-prefix to the mobile network user, the BNG or eBNG may acquire the user address, according to the sub-prefix allocated by the BNG or eBNG to the mobile network user (that is, the user address prefix allocated to the mobile network user); when the way of the defined network allocating a user address to a mobile network user according to a user address prefix is that the BNG or eBNG distributes a user address sub-sub-prefix to an RG and the RG allocates a user address to the mobile network user, the BNG or eBNG receives the user address which is allocated to the mobile network user by the RG and then reported by the RG; certainly, the mobile network user may report its own user address if needed (e.g. when the mobile network user initiates a specific service), for example, the BNG or eBNG receives the user address reported by the mobile network user; for another example, the mobile network user reports the user address to the RG, and the BNG or eBNG receives the user address forwarded by the RG.

Preferably, when informing the mobile network of the allocated user address, the defined network also informs the mobile network of the mobile network identifier of the mobile network user; in implementation, the defined network, after acquiring the mobile network identifier of the mobile network user, informs the mobile network of the acquired mobile network identifier along with the allocated user address, so that the mobile network can rapidly interact with the mobile network user on services according to a corresponding user address. Further, the user address may also be carried in an accounting start message, for example, the user address is carried in an accounting start message sent from the RG to the BNG or eBNG, or in an accounting start message sent from the BNG or eBNG to the AAA server in the defined network, or in an accounting start message sent from the AAA server in the defined network to the AAA server in the mobile network.

A device for informing user address is also provided in the embodiment, which is used to realize the foregoing embodiments and preferred implementation which are described above and not described here repeatedly. The termed 'component', as used herein, may achieve software and/or hardware of specific functions or the combination thereof. Although it is preferred to achieve the device described in the following embodiments using software, the achievement of the device using hardware or the combination of software and hardware is also conceivable.

Figure 4:
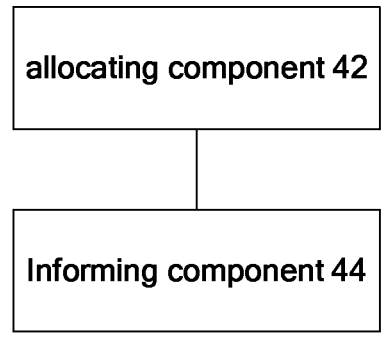
FIG. 4 is a block diagram illustrating the structure of a device for informing user address according to an embodiment of the disclosure.

FIG. 4 is a block diagram illustrating the structure of a device for informing user address according to an embodiment of the disclosure, and as shown in FIG. 4, the device located in a defined network comprises an allocating component 42 and an informing component 44, and the device is described below. The allocating component 42 is configured to allocate, according to a user address prefix provided by a mobile network, a user address to a mobile network user accessing the mobile network from the defined network; and the informing component 44 is configured to inform the mobile network of the allocated user address.

Figure 5:
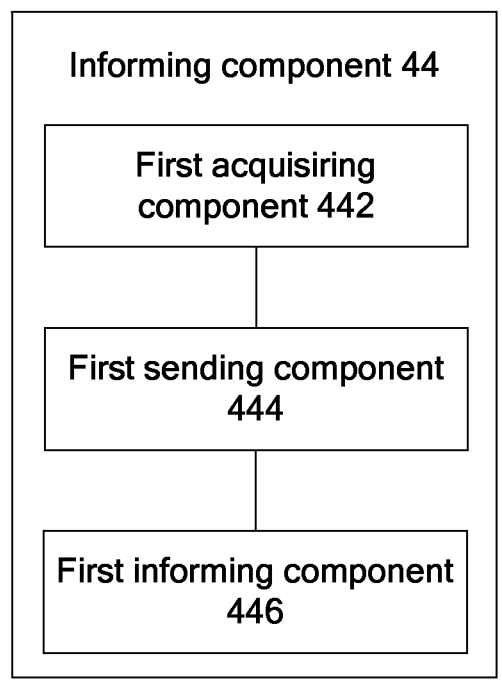
FIG. 5 is a block diagram 1 illustrating the structure of an informing component 44 in a device for informing user address according to an embodiment of the disclosure.

FIG. 5 is a block diagram 1 illustrating the structure of the informing component 44 in the device for informing user address according to an embodiment of the disclosure, and as shown in FIG. 5, the informing component 44 includes a first acquiring component 442, a first sending component 444 and a first informing component 446. The informing component 44 is described below. The first acquiring component 442, located in a BNG or eBNG in the defined network, is configured to acquire the user address allocated by the defined network; the first sending component 444, located in the BNG or eBNG, is configured to send the acquired user address to an AAA server in the defined network; and the first informing component 446, located in the AAA server in the defined network, is configured to inform an AAA server in the mobile network of the user address.

Figure 6:
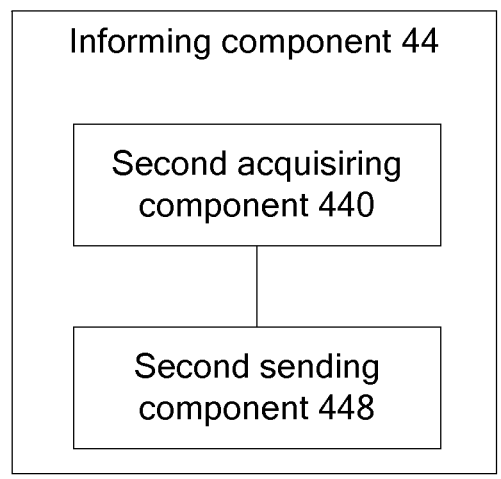
FIG. 6 is a block diagram 2 illustrating the structure of an informing component 44 in a device for informing user address according to an embodiment of the disclosure.

FIG. 6 is a block diagram 2 illustrating the structure of the informing component 44 in the device for informing user address according to an embodiment of the disclosure, and as shown in FIG. 6, the informing component 44 includes a second acquiring component 440 and a second sending component 448. The informing component 44 is described below. The second acquiring component 440, located in a BNG or an eBNG in the defined network, is configured to acquire the user address allocated by the defined network; and the second sending component 448 may exist in the following two forms: a second sending component 448a, located in the BWAG of the BNG, is configured to send the acquired user address to a mobile network gateway in the mobile network, or a second sending component 448b, located in the eBNG, is configured to send the acquired user address to a mobile network gateway in the mobile network.

Preferably, the first acquiring component 442 or the second acquiring component 440 acquires the user address by at least one of the following ways: the BNG or eBNG acquires the user address according to the user address prefix allocated to the mobile network user; the BNG or eBNG receives the user address allocated and reported by a RG; the BNG or eBNG receives the user address reported by the mobile network user; and the BNG or eBNG receives the user address forwarded by the RG, wherein the mobile terminal user reports the user address to the RG.

The informing component 44 is further configured to, after the defined network acquires the mobile network identifier of the mobile network user, inform the mobile network of the mobile network identifier and the allocated user address.

As to the problem of how to support an FMC application in a related network architecture, the above embodiments and preferred embodiments provide solutions to allocate a user address and inform the above mobile network of the allocated user address in an FMC application orientated network architecture. The problem of FMC application mentioned here may be the application of various mobile networks and defined network. Any concept put forward on the basis of the disclosure can be realized using the method provided herein, and below is the description on an example in which a mobile network is a 3GPP and a defined network is a BBF network.

Triggering mode: the 3GPP network provides an IPv6 prefix to a BBF network after a 3GPP UE is successfully authenticated.

After the UE passes the authentication and is allocated a user address according to the above prefix, the address and the mobile network identifier of the UE are reported to the 3GPP by the BBF network.

After a mobile network UE attached from the access network of the defined network is successfully authenticated, if the defined network allocates an address to the UE using the IPv6 prefix provided by the mobile terminal, the defined network informs the mobile network of the IP address and the identifier of the UE when the address allocation is succeeded or when the UE initiates a service.

Specifically, after the UE is successfully authenticated, the AAA server in the mobile terminal provides the user attribute, the access mode, the IPv6 prefix and other information of the UE to the AAA server in the defined network, so that the defined network allocates a user address to the mobile network user according to the user address prefix.

After the UE address is successfully allocated, the defined network informs the mobile network of the user address of the mobile network user in the following two ways in specific implementation: (1) the defined network informs the AAA server in the mobile network of the user address, that is, the AAA server in the defined network sends the IP address and the user identifier of the UE to the AAA server in the mobile network: (2) the defined network informs the mobile network gateway in the mobile network of the user address, that is, the access gateway in the defined network sends the IP address and the identifier of the UE to the mobile network gateway. Different processing methods are separately described below.

Method 1: the BNG or RG reports the IP address and/or the identifier of the UE to the AAA server in the mobile network via the AAA server in the defined network.

After the UE is successfully authenticated, the AAA server in the defined network provides the IPv6 prefix of the UE to the BNG, and the BNG allocates an address to the UE. The BNG sends the IP address and/or the identifier of the UE to the AAA server in the defined network. It should be noted that only the prefix needs to be reported if the sub-prefix of each user is different (optionally, the IP address and/or the identifier of the UE is carried in an accounting start message sent from the BNG to the AAA server in the defined network), and the AAA server in the defined network provides the IP address and the identifier of the UE to the AAA server in the mobile network (optionally, the IP address and/or the identifier of the UE is carried in an accounting start message sent from the AAA server in the defined network to the AAA server in the mobile network). (RG is of a bridge type).

Alternatively,

After the UE is successfully authenticated, the AAA server in the defined network provides the IPv6 prefix of the UE to the RG via the BNG, and the RG allocates an address to the UE. The RG (or the BNG) sends the IP address and/or the mobile network identifier of the UE to the AAA server in the defined network (optionally, the IP address and/or the identifier of the UE is carried in an accounting start message sent from the RG to a BBF AAA (or via the BNG), and the AAA server in the defined network provides the IP address and the identifier of the UE to the AAA server in the mobile network (optionally, the IP address and/or the identifier of the UE is carried in an accounting start message sent from the AAA server in the defined network to the AAA server in the mobile network). (RG is of a router type).

Method 2: the UE reports its UE address and/or identifier to the AAA server in the mobile network via the RG/BNG and the AAA server in the defined network.

After the UE is successfully authenticated, the AAA server in the defined network provides the IPv6 prefix of the UE to the BNG, and the BNG allocates an address to the UE. The UE reports its own address and/or identifier to the BNG (or reports after receiving a request message which is sent from the BNG in the defined network to request the UE to report address), the BNG reports the address of the UE to the AAA server in the defined network (or reports after receiving a request message which is sent from the AAA server in the defined network to request the BNG to report the address of the UE), the AAA server in the defined network reports the address and/or the identifier of the user to the AAA server in the mobile network (or reports after receiving a request message which is sent from the AAA server in the mobile network to request the AAA server in the defined network to report the address of the UE). (RG is of a bridge type).

Alternatively,

After the UE is successfully authenticated, the AAA server in the defined network provides the IPv6 prefix of the UE to the RG via the BNG, and the RG allocates an address to the UE. The UE reports its own address and/or identifier to the RG (or reports after receiving a request message which is sent from the RG to request the UE to report address), the RG reports the address and/or the identifier of the UE to the AAA server in the defined network (or reports after receiving a request message which is sent from the BNG to request the RG to report the address of the UE) (or reports after receiving a request message which is sent from the AAA to request the BNG to report the address of the UE), the AAA server in the defined network reports the address and/or the identifier of the user to the AAA server in the mobile network (or reports after receiving a request message which is sent from the AAA server in the mobile network to request the AAA server in the defined network to report the address of the UE). (RG is of a router type).

It should be noted that in the foregoing methods 1 and 2, the defined network informs the mobile network of the user address of the mobile network user in the following way: the defined network informs the AAA server in the mobile network.

Method 3: the BNG or RG reports the IP address and/or the identifier of the UE via access gateway BWAG in the defined network.

After the UE is successfully authenticated, the AAA server in the defined network provides the IPv6 prefix of the UE to the BNG, and the BNG allocates an address to the UE. The BNG reports the IP address and/or the mobile network identifier of the UE to a access gateway in the defined network (or reports after receiving a request message which is sent from the access gateway in the defined network to request the BNG to report the address of the UE), and the access gateway in the defined network reports the IP address and/or the mobile network identifier of the UE to the mobile network gateway (or reports after receiving a request message which is sent from the mobile network gateway to request the access gateway in the defined network to report the address of the UE). (RG is of a bridge type).

Alternatively,

After the UE is successfully authenticated, the AAA server in the defined network provides the IPv6 prefix of the UE to the RG via the BNG, and the RG allocates an address to the UE. The RG reports the IP address and/or the identifier of the UE to the access gateway in the defined network via the BNG (or reports after receiving a request message which is sent from the BNG in the defined network to request the RG to report the address of the UE) (or reports after receiving a request message which is sent from the access gateway in the defined network to request the BNG to report the address of the UE), the access gateway in the defined network reports the address and/or the identifier of the user to the mobile network gateway (or reports after receiving a request message which is sent from the mobile network gateway to request the access gateway in the defined network to report the address of the UE). (RG is of a router type).

Method 4: the UE reports its address and/or mobile network identifier to the mobile network gateway via the RG/BNG and the access gateway BWAG in the defined network After the UE is successfully authenticated, the AAA server in the defined network provides the IPv6 prefix of the UE to the BNG, and the BNG allocates an address to the UE. The UE reports its own address and/or mobile network identifier to the BNG (or reports after receiving a request message which is sent from the BNG in the defined network to request the UE to report address), and the BNG reports the address and/or mobile network identifier of the UE to the access gateway in the defined network (or reports after receiving a request message which is sent from the access gateway in the defined network to request the BNG to report the address of the UE), and the access gateway in the defined network reports the address and/or mobile network identifier of the UE to the mobile network gateway (or reports after receiving a request message which is sent from the mobile network gateway to request the access gateway in the defined network to report the address of the UE). (RG is of a bridge type).

Alternatively,

After the UE is successfully authenticated, the AAA server in the defined network provides the IPv6 prefix of the UE to the RG via the BNG, and the RG allocates an address to the UE. The UE reports its own address and/or mobile network identifier to the RG (or reports after receiving a request message which is sent from the RG to request the UE to report its address); the RG reports the address and/or the mobile network identifier of the UE to the access gateway in the defined network via the BNG (or reports after receiving a request message which is sent from the BNG to request the RG to report the address of the UE) (or reports after receiving a request message which is sent from the access gateway in the defined network to request the BNG to report the address of the UE), further, the access gateway in the defined network reports the address and/or the mobile network identifier of the UE to the mobile network gateway (or reports after receiving a request message which is sent from the mobile network gateway to request the access gateway in the defined network to report the address of the UE). (RG is of a router type).

It should be noted that in the foregoing methods 3 and 4, the defined network informs the mobile network of the address of the mobile network user in the following way: the defined network informs the mobile network gateway in the mobile network.

Above is an implementation or preferred implementation for a defined network informing a mobile network of the address of a mobile network user in a scenario where a BNG and a BWAG are set separately, and a defined network substantially executes the same steps to inform a mobile network of the address of a mobile network user in a scenario where a BNG and a BWNG in a defined network are not set separately, and in a scenario where a BNG and a BWNG are integrated (that is, the BNG and the BWAG are integrated into an eBNG), the eBNG executes all the functions that are executed by the BNG and the BWAG in a scenario where the BNG and the BWAG are set separately. Therefore, the foregoing implementation and preferred implementation adopted in a scenario where a BNG and a BWAG are set separately are also adopted to a scenario where a BNG and a BWAG are integrated.

Aiming at the problems of how to allocate a user address and how to inform a mobile network of the allocated user address in two functional architectures for realizing FMC application mentioned in related technologies, an optimized method for allocating and informing user address is provided in the embodiment. The two architectures are separately described below.

A implementation for the defined network informing an AAA server in a mobile network of the user address of a mobile network user is described in the following FIG. 7 and FIG. 8.

Figure 7:
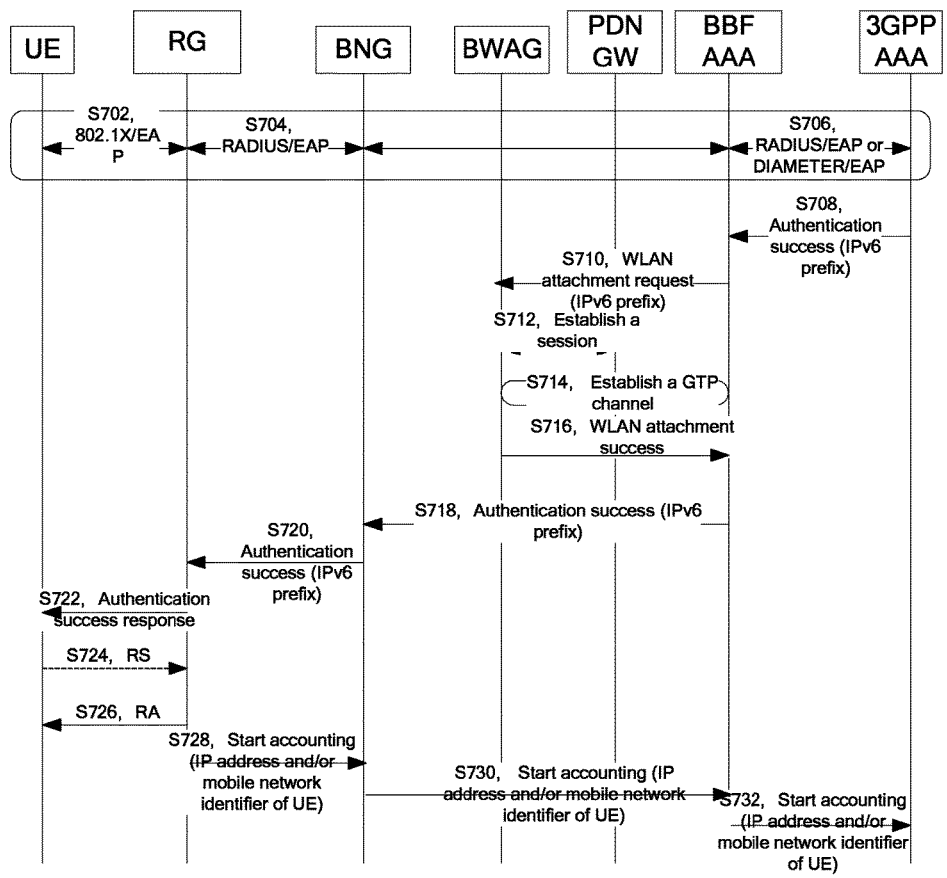
FIG. 7 is a flowchart illustrating a method for allocating and informing user address according to embodiment 1 of the disclosure.

FIG. 7 is a flowchart illustrating a method for allocating and informing the user address according to embodiment 1 of the disclosure, and as shown in FIG. 7, the flow includes the following steps:

Step S702: a mobile network UE sends an Extendable Authentication Protocol-Start (EAPoL-Start) message to an RG to be authenticated by the 802.1X protocol, wherein the UE is a 802.1X client, and the RG is a 802.1X authenticator;

After receiving the EAPoL-Start message sent from the UE, the RG in the defined network sends an EAP Identity Request message to the UE to inform the UE to report a user name. After receiving the EAP Identity Request message sent from the RG, the UE returns the RG an EAP Identity Response message, wherein the user name is carried in the EAP Identity Response message.

Figure 8:
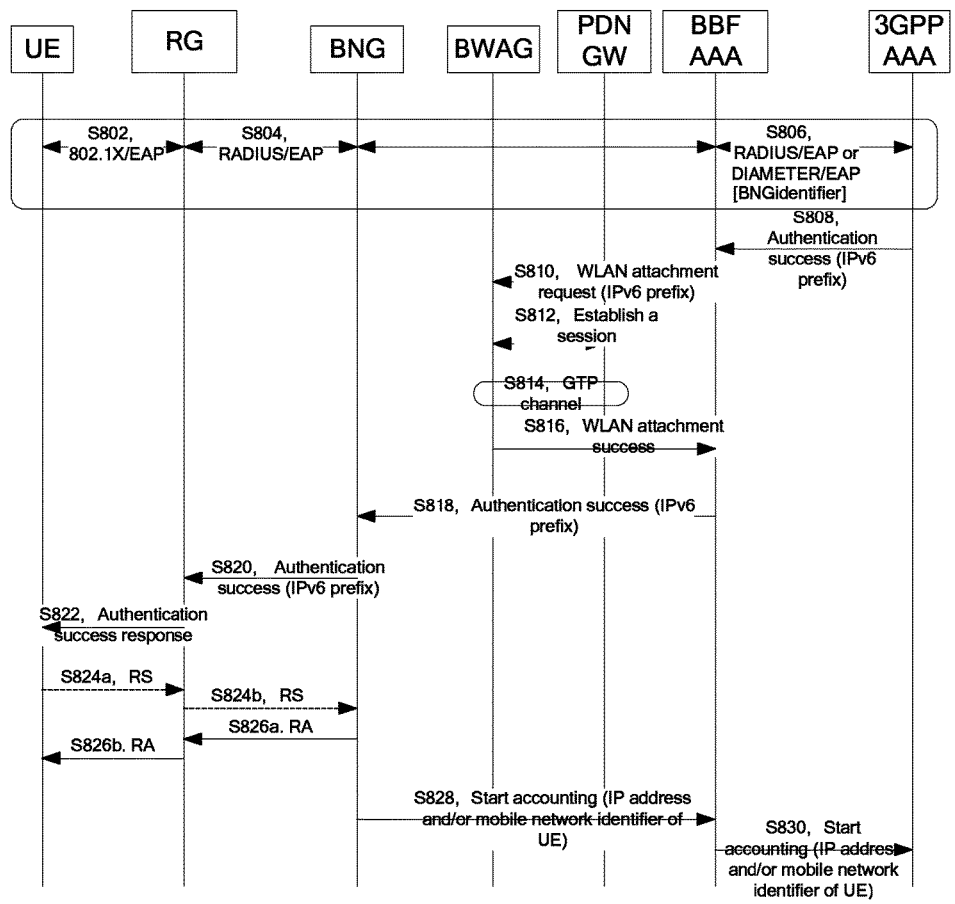
FIG. 8 is a flowchart illustrating a method for allocating and informing user address according to embodiment 2 of the disclosure.

Step S704: the RG encapsulates the received EAP Identity Response message into a RADIUS Access Request message and sends the RADIUS Access Request message to the BNG;

Step S706: as a RADIUS Proxy, the BNG sends the RADIUS Access Request message received from the RG to a BBF AAA, and the BBF AAA forwards the RADIUS Access Request message received from the BNG to a 3GPP AAA according to the Network Address Identifier (NAI) of the UE; if the BBF network uses a RADIUS protocol while the 3GPP network uses a DIAMETER protocol, then there is a Translation Agent (TA) for protocol conversion between the BBF AAA and the 3GPP AAA; in this step, the BBF AAA sends its own identifier to the 3GPP AAA;

Step S708: after the UE passes the authentication, the 3GPP AAA returns the BBF AAA an authentication success response message, wherein the subscription information and the access mode of the UE is carried in the authentication success response message, specifically, the access mode represents whether the mobile network UE attached from a access network (e.g. BBF access network) of the defined network is connected with its home core network (e.g. 3GPP core network) or distributary from the defined network; the 3GPP AAA also provides an IPv6 prefix to the BBF AAA to access the defined network and to meet the address allocation of a 3GPP UE in a certain access mode;

Step S710: the BBF AAA sends the attachment request message of the 3GPP UE to the BWAG, wherein the IPv6 prefix sent by the 3GPP AAA is carried in the attachment request message;

Step S712: the BWAG creates a session with the PDN gateway of the 3GPP network;

Step S714: a GTP channel of an IPv6 prefix level is established, that is, 3GPP UEs having the same IPv6 prefix share the channel;

Step S716: the BWAG returns a WLAN Attach Accept message indicating the attachment success of the 3GPP UE to the BBF AAA;

Step S718: the BBF AAA sends the authentication success response message of the UE to the BNG, wherein the access mode of the UE is carried in the authentication success response message; the BNG stores the MAC address of the UE passing the authentication; meanwhile, the BBF AAA divides a sub-prefix from the received IPv6 prefix, and sends to the BNG (that is, allocates different sub-prefixes to different BNGs);

Step S720: the BNG sends the authentication success response message of the UE to the RG, wherein the access mode of the UE is carried in the authentication success response message; the RG stores the MAC address of the UE passing the authentication; meanwhile, the BNG divides a sub-sub-prefix from the received IPv6 sub-prefix, and sends to the RG (that is, allocates different sub-prefixes to different RGs);

Step S722: the RG returns an EAP Success response message to the UE;

Step S724: the UE sends an address request message, such as a Router Solicitation (RS) message (optional), to the RG;

Step S726: the RG allocates an IP address to the UE according to the sub-prefix of the IPv6; alternatively, after receiving the address request message (e.g. RS message) initiated by the UE, the RG sends the IP address of the UE to the UE according to the MAC address and/or the access mode of the UE;

Step S728: the RG sends the accounting start message to the BNG, wherein the IP address and/or the mobile network identifier of the UE is carried in an accounting start message;

Step S730: as a RADIUS Proxy, the BNG sends the accounting start message received from the RG to the BBF AAA;

Step S732: the BBF AAA sends the accounting start message to an AAA server in the mobile network, wherein, the IP address and/or the mobile network identifier of the UE is carried in the accounting start message;

FIG. 8 is a flowchart illustrating a method for allocating and informing user address according to embodiment 2 of the disclosure, and as shown in FIG. 8, the flow includes the following steps:

Step S802: a mobile network UE sends an EAPoL-Start message to an RG to be authenticated by the 802.1X protocol, wherein, the UE is a 802.1X client, and the RG is a 802.1X authenticator.

After receiving the EAPoL-Start message sent from the UE, the RG in the defined network sends an EAP Identity Request message to the UE to inform the UE to report a user name. After receiving the EAP Identity Request message sent from the RG, the UE returns the RG an EAP Identity Response message, a user name is carried in the EAP Identity Response message.

Step 804: the RG encapsulates the received EAP Identity Response message into a RADIUS Access Request message and then sends the RADIUS Access Request message to the BNG;

Step S806: as a RADIUS Proxy, the BNG sends the RADIUS Access Request message received from the RG to a BBF AAA, and the BBF AAA forwards the RADIUS Access Request message received from the BNG to a 3GPP AAA according to the NAI of the UE; if the BBF network uses a RADIUS protocol while the 3GPP network uses a DIAMETER protocol, then there is a TA for protocol conversion between the BBF AAA and the 3GPP AAA; in this step, the BBF AAA sends its own identifier to the 3GPP AAA;

Step S808: after the UE passes the authentication, the 3GPP AAA returns the BBF AAA an authentication success response message, wherein the subscription information and the access mode of the UE is carried in the authentication success response message, specifically, the access mode represents whether the mobile network UE attached from a access network (e.g. BBF access network) of the defined network is connected with its home core network (e.g. 3GPP core network) or distributary from the defined network; the 3GPP AAA further provides an IPv6 prefix to the BBF AAA to access the defined network and to meet the address allocation of a 3GPP UE in a certain access mode;

Step S810: the BBF AAA sends the attachment request message of the 3GPP UE to the BWAG, wherein the IPv6 prefix sent by the 3GPP AAA is carried in the attachment request message;

Step S812: the BWAG creates a session with the PDN gateway of the 3GPP network;

Step S814: a GTP channel of an IPv6 prefix level is established, that is, 3GPP UEs having the same IPv6 prefix share the channel;

Step S816: the BWAG returns a WLAN Attach Accept message indicating the attachment success of the 3GPP UE to the BBF AAA;

Step S818: the BBF AAA sends the authentication success response message of the UE to the BNG, wherein the access mode of the UE is carried in the authentication success response message; the BNG stores the MAC address of the UE passing the authentication; meanwhile, the BBF AAA divides a sub-prefix from the received IPv6 prefix, and sends to the BNG (that is, allocates different sub-prefixes to different BNGs);

Step S820: the BNG sends the authentication success response message of the UE to the RG, wherein the access mode of the UE is carried in the authentication success response message;

Step S822: the RG returns an EAP Success response message to the UE;

Step S824: the UE sends an RS message to the BNG, this step including: a Step S824a: the UE sends an address request message, such as an RS message (optional), to the RG; and a Step S824b: the RG transparently transmits the RS message of the UE to the BNG;

Step S826: the BNG sends an RA message to the UE, this step including: a Step S826a: the BNG allocates an IP address to the UE according to the sub-prefix of the IPv6; alternatively, after receiving the address request message (e.g. RS message) initiated by the UE, the RG sends the IP address of the UE to the UE according to the MAC address and/or the access mode of the UE; and a Step S826b: the RG transparently transmits the RA message to the UE;

Step S828: the BNG sends the accounting start message to the BBF AAA, wherein the IP address and/or the mobile network identifier of the UE is carried in an accounting start message;

Step S830: the BBF AAA sends the accounting start message to the BNG, wherein the IP address and/or the mobile network identifier of the UE in an accounting start message is carried in the accounting start message;

A implementation for the defined network informing a mobile network gateway in a mobile network of the user address of a mobile network user is described in the following FIG. 9 and FIG. 10.

Figure 9:
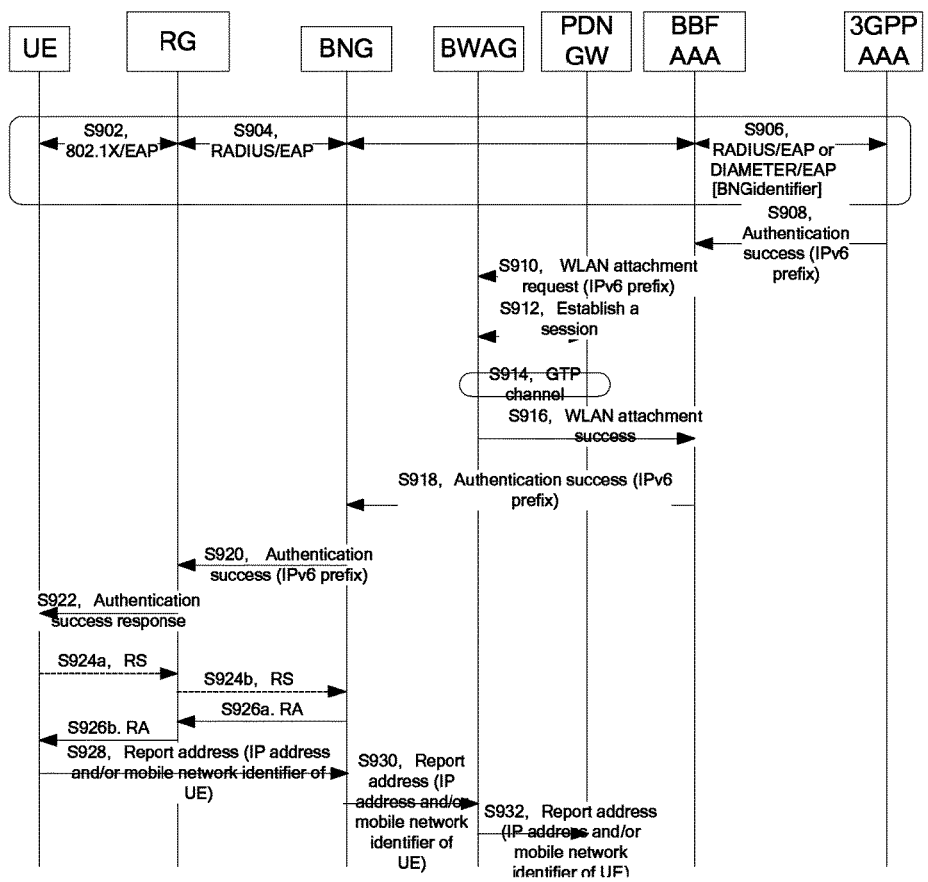
FIG. 9 is a flowchart illustrating a method for allocating and informing user address according to embodiment 3 of the disclosure.

FIG. 9 is a flowchart illustrating a method for allocating and informing user address according to embodiment 3 of the disclosure, and as shown in FIG. 9, the flow includes the following steps:

Step S902: a mobile network UE sends an EAPoL-Start message to an RG to be authenticated by the 802.1X protocol, wherein the UE is a 802.1X client, and the RG is a 802.1X authenticator;

after receiving the EAPoL-Start message sent from the UE, the RG in the defined network sends an EAP Identity Request message to the UE to inform the UE to report a user name. After receiving the EAP Identity Request message sent from the RG, the UE returns the RG an EAP Identity Response message, wherein a user name is carried in the EAP Identity Response message;

Step 904: the RG encapsulates the received EAP Identity Response message into a RADIUS Access Request message and then sends the RADIUS Access Request message to the BNG;

Step S906: as a RADIUS Proxy, the BNG sends the RADIUS Access Request message received from the RG to a BBF AAA, and the BBF AAA forwards the RADIUS Access Request message received from the BNG to a 3GPP AAA according to the NAI of the UE; if the BBF network uses a RADIUS protocol while the 3GPP network uses a DIAMETER protocol, then there is a Translation Agent (TA) for protocol conversion between the BBF AAA and the 3GPP AAA; in this step, the BBF AAA sends its own identifier to the 3GPP AAA;

Step S908: after the UE passes the authentication, the 3GPP AAA returns the BBF AAA an authentication success response message, wherein the subscription information and the access mode of the UE is carried in the authentication success response message, specifically, the access mode represents whether the mobile network UE attached from a access network (e.g. BBF access network) of the defined network is connected with its home core network (e.g. 3GPP core network) or distributary from the defined network; the 3GPP AAA also provides an IPv6 prefix to the BBF AAA to access the defined network and to meet the address allocation of a 3GPP UE in a certain access mode;

Step S910: the BBF AAA sends the attachment request message of the 3GPP UE to the BWAG, wherein the IPv6 prefix sent by the 3GPP AAA is carried in the attachment request message;

Step S912: the BWAG creates a session with the PDN gateway of the 3GPP network;

Step S914: a GTP channel of an IPv6 prefix level is established, that is, 3GPP UEs having the same IPv6 prefix share the channel;

Step S916: the BWAG returns a WLAN Attach Accept message indicating the attachment success of the 3GPP UE to the BBF AAA;

Step S918: the BBF AAA sends the authentication success response message of the UE to the BNG, wherein the access mode of the UE is carried in the authentication success response message; the BNG stores the MAC address of the UE passing the authentication; meanwhile, the BBF AAA divides a sub-prefix from the received IPv6 prefix, and send to the BNG (that is, allocates different sub-prefixes to different BNGs);

Step S920: the BNG sends the authentication success response message of the UE to the RG, wherein the access mode of the UE is carried in the authentication success response message;

Step S922: the RG returns an EAP Success response message to the UE;

Step S924: the UE sends an RS message to the BNG, this step including: a Step S924a: the UE sends an address request message, such as an RS message (optional), to the RG; and a Step S924b: the RG transparently transmits the RS message of the UE to the BNG;

Step S926: the BNG sends an RA message to the UE, this step including: a Step S926a: the BNG allocates an IP address to the UE according to the sub-prefix of the IPv6; alternatively, after receiving the address request message (e.g. RS message) initiated by the UE, the RG sends the IP address of the UE to the UE according to the MAC address and/or the access mode of the UE; and a Step S926b: the RG transparently transmits the RA message to the UE;

Step S928: the UE reports its own IP address and/or mobile network identifier to the BNG;

Step S930: the BNG reports the IP address and/or the mobile network identifier of the UE to the BWAG;

Step S932: the BWAG reports the IP address and/or the mobile network identifier of the UE to the PDN GW.

Figure 2:
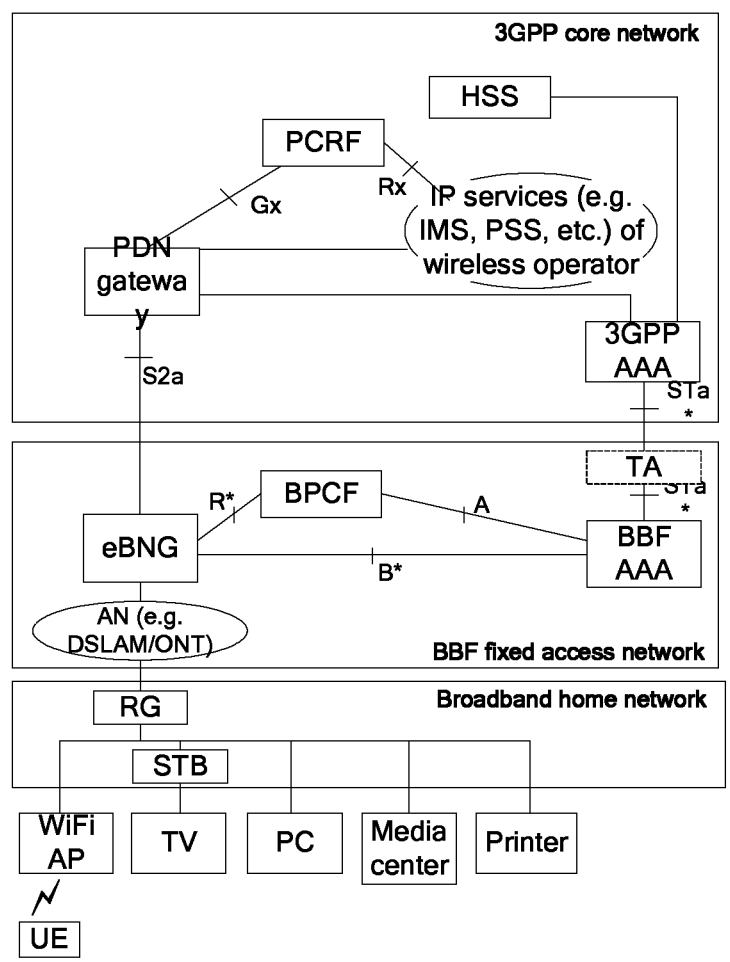
FIG. 2 is a diagram illustrating a network architecture including an enhanced BNG in a related technology.
Figure 10:
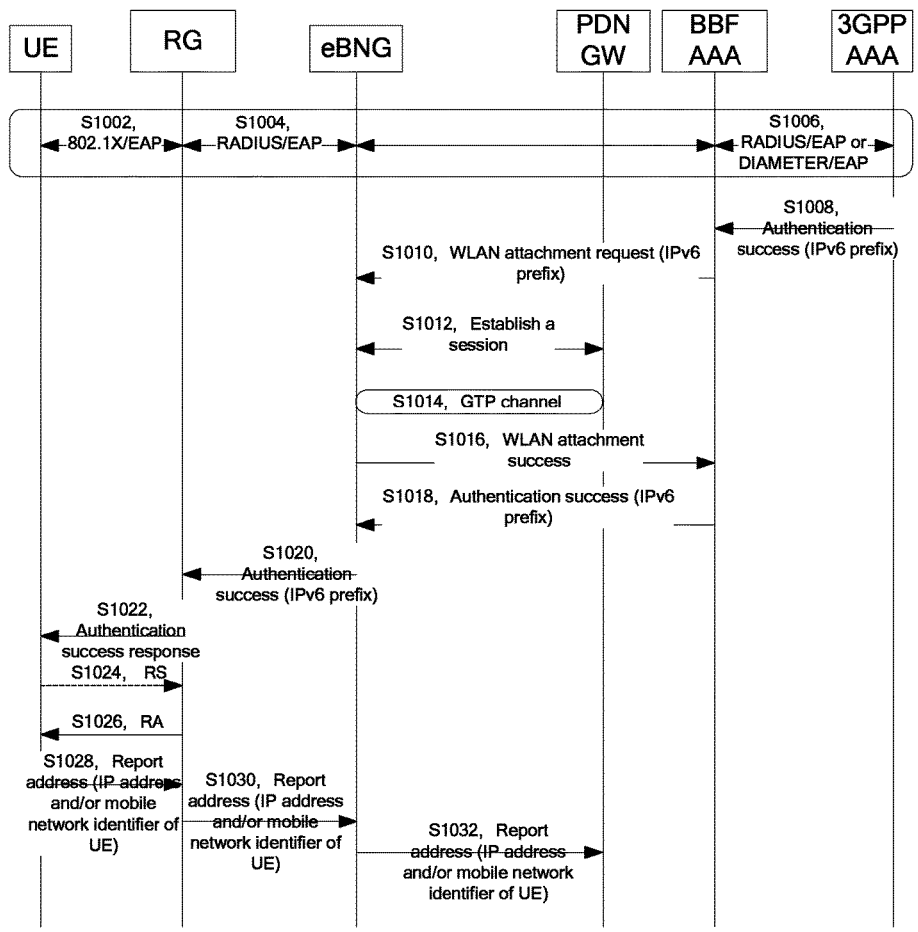
FIG. 10 is a flowchart illustrating a method for allocating and informing user address according to embodiment 4 of the disclosure.

FIG. 10 is a flowchart illustrating a method for allocating and informing user address according to embodiment 4 of the disclosure, it should be noted that a scenario where a BNG is integrated with a BWAG into an eBNG (as shown in FIG. 2) is taken into consideration in the embodiment, and as shown in FIG. 10, the flow includes the following steps:

Step S1002: a mobile network UE sends an EAPoL-Start message to an RG to be authenticated by the 802.1X protocol; wherein the UE is a 802.1X client, and the RG is a 802.1X authenticator;

after receiving the EAPoL-Start message sent from the UE, the RG in the defined network sends an EAP Identity Request message to the UE to inform the UE to report a user name. After receiving the EAP Identity Request message sent from the RG, the UE returns the RG an EAP Identity Response message, wherein a user name is carried in the EAP Identity Response message;

Step S1004: the RG encapsulates the received EAP Identity Response message into a RADIUS Access Request message and then sends the RADIUS Access Request message to the eBNG;

Step S1006: as a RADIUS Proxy, the eBNG sends the RADIUS Access Request message received from the RG to a BBF AAA, and the BBF AAA forwards the RADIUS Access Request message received from the eBNG to a 3GPP AAA according to the NAI of the UE; if the BBF network uses a RADIUS protocol while the 3GPP network uses a DIAMETER protocol, then there is a TA for protocol conversion between the BBF AAA and the 3GPP AAA; in this step, the BBF AAA sends its own identifier to the 3GPP AAA;

Step S1008: after the UE passes the authentication, the 3GPP AAA returns the BBF AAA an authentication success response message, wherein the subscription information and the access mode of the UE is carried in the authentication success response message, specifically, the access mode represents whether the mobile network UE attached from a access network (e.g. BBF access network) of the defined network is connected with its home core network (e.g. 3GPP core network) or distributary from the defined network; the 3GPP AAA also provides an IPv6 prefix to the BBF AAA to access the defined network and to meet the address allocation of a 3GPP UE in a certain access mode;

Step S1010: the BBF AAA sends the attachment request message of the 3GPP UE to the eBNG, divides a sub-prefix from the IPv6 prefix received and sends the sub-prefix to the eBNG (that is, allocates different sub-prefixes to different eBNGs);

Step S1012: the eBNG creates a session with the PDN gateway of the 3GPP network;

Step S1014: a GTP channel of an IPv6 prefix level is established, that is, 3GPP UEs having the same IPv6 prefix share the channel;

Step S1016: the eBNG returns a WLAN Attach Accept message indicating the attachment success of the 3GPP UE to the BBF AAA;

Step S1018: the BBF AAA sends the authentication success response message of the UE to the BNG, wherein the access mode of the UE is carried in the authentication success response message; the BNG stores the MAC address of the UE passing the authentication; meanwhile, the BBF AAA divides a sub-prefix from the received IPv6 prefix, and sends to the BNG (that is, allocates different sub-prefixes to different BNGs);

Step S1020: the eBNG sends the authentication success response message of the UE to the RG, wherein the access mode of the UE is carried in the authentication success response message; the RG stores the MAC address of the UE passing the authentication; meanwhile, the eBNG divides a sub-sub-prefix from the received IPv6 sub-prefix, and sends to the RG (that is, allocates different sub-prefixes to different RGs);

Step S1022: the RG returns an EAP Success response message to the UE;

Step S1024: the UE sends an address request message, such as an RS message (optional), to the RG;

Step S1026: the RG allocates an IP address to the UE according to the sub-prefix of the IPv6; alternatively, after receiving the address request message (e.g. RS message) initiated by the UE, the RG sends the IP address of the UE to the UE according to the MAC address and/or the access mode of the UE;

Step S1028: the UE reports its own IP address and/or mobile network identifier to the RG;

Step S1030: the RG reports the IP address and/or the mobile network identifier of the UE to the eBNG;

Step S1032: the eBNG reports the IP address and/or the mobile network identifier of the UE to the PDN GW.

Obviously, those skilled in the art shall understand that the above-mentioned components and steps of the disclosure can be realized by using general purpose calculating device, can be integrated in one calculating device or distributed on a network which consists of a plurality of calculating devices. Alternatively, the components and the steps of the disclosure can be realized by using the executable program code of the calculating device. Consequently, they can be stored in the storing device and executed by the calculating device, and in some cases, the steps shown or described herein can be executed in a sequence different from this presented herein, or they are made into integrated circuit component respectively, or a plurality of components or steps thereof are made into one integrated circuit component. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements of the disclosure are all included in the scope of the protection of the disclosure.

What is claimed is:

1. A method for informing a user address, comprising:
a defined network allocating, according to a user address prefix provided by a mobile network, a user address to a mobile network user accessing the mobile network from the defined network; and
the defined network informing the mobile network of the allocated user address;
wherein the defined network informing the mobile network of the allocated user address comprises:
acquiring, by a Broadband Network Gateway (BNG) or an enhanced BNG (eBNG) in the defined network, the user address allocated by the defined network; and
sending, by the BNG, the acquired user address to a mobile network gateway in the mobile network via a Broadband Forum (BBF) WLAN Access Gateway (BWAG) in the defined network, or sending, by the eBNG, the acquired user address to the mobile network gateway in the mobile network.

2. The method according to claim 1, wherein the defined network informing the mobile network of the allocated user address further comprises:
sending, by the BNG or eBNG, the acquired user address to an Authentication Authorization Accounting (AAA) server in the defined network; and
informing, by the AAA server in the defined network, an AAA server in the mobile network of the user address.

3. The method according to claim 2, wherein the BNG or eBNG acquires the user address by at least one of the following ways:
- the BNG or eBNG acquiring the user address according to the user address prefix allocated to the mobile network user;
- the BNG or eBNG receiving the user address allocated and reported by a Residual Gateway (RG);
- the BNG or eBNG receiving the user address reported by the mobile network user; and
- the BNG or eBNG receiving the user address forwarded by the RG, wherein the mobile terminal user reports the user address to the RG.

4. The method according to 2, wherein the BNG or eBNG acquiring the user address comprises: receiving an accounting start message, wherein the user address is carried in the accounting start message.

5. The method according to claim 1, wherein informing, by the defined network, the mobile terminal of the allocated user address comprises: after the defined network acquiring the mobile network identifier of the mobile network user, informing the mobile network of the acquired mobile network identifier and the allocated user address.

6. A device for informing user address, located in a defined network, comprising:
- an allocating component, configured to allocate, according to a user address prefix provided by a mobile network, a user address to a mobile network user accessing the mobile network from the defined network; and
- an informing component, configured to inform the mobile network of the allocated user address;
- a first acquiring component, located in a Broadband Network Gateway (BNG) or an enhanced BNG (eBNG) in the defined network, configured to acquire the user address allocated by the defined network; and
- a first sending component, located in the BNG, configured to send the acquired user address to a mobile network gateway in the mobile network via a Broadband Forum (BBF) WLAN Access Gateway (BWAG); or located in the eBNG, configured to send the acquired user address to a mobile network gateway in the mobile network.

7. The device according to claim 6, wherein the informing component further comprises:
- a second sending component, located in the BNG or eBNG, configured to send the acquired user address to an Authentication Authorization Accounting (AAA) server in the defined network; and
- a first informing component, located in the AAA server in the defined network, configured to inform an AAA server in the mobile network of the user address.

8. The device according to claim 7, wherein the first acquiring component or the second acquiring component, configured to acquire the user address by at least one of the following ways:
- the BNG or eBNG acquiring the user address according to the user address prefix allocated to the mobile network user;
- the BNG or eBNG receiving the user address allocated and reported by a Residual Gateway (RG);
- the BNG or eBNG receiving the user address reported by the mobile network user; and
- the BNG or eBNG receiving the user address forwarded by the RG, wherein the mobile terminal user reports the user address to the RG.

9. The device according to claim 6, wherein the informing component is further configured to, after the defined network acquiring the mobile network identifier of the mobile network user, inform the mobile network of the acquired mobile network identifier and the allocated user address.

10. The method according to claim 1, wherein the BNG or eBNG acquiring the user address by at least one of the following ways:
- the BNG or eBNG acquiring the user address according to the user address prefix allocated to the mobile network user;
- the BNG or eBNG receiving the user address allocated and reported by a Residual Gateway (RG);
- the BNG or eBNG receiving the user address reported by the mobile network user; and
- the BNG or eBNG receiving the user address forwarded by the RG, wherein the mobile terminal user reports the user address to the RG.

11. The method according to 1, wherein the BNG or eBNG acquiring the user address comprises: receiving an accounting start message, wherein the user address is carried in the accounting start message.

12. The device according to claim 6, wherein the first acquiring component or the second acquiring component, configured to acquire the user address by at least one of the following ways:
- the BNG or eBNG acquiring the user address according to the user address prefix allocated to the mobile network user;
- the BNG or eBNG receiving the user address allocated and reported by a Residual Gateway (RG);
- the BNG or eBNG receiving the user address reported by the mobile network user; and
- the BNG or eBNG receiving the user address forwarded by the RG, wherein the mobile terminal user reports the user address to the RG.

* * * * *